United States Patent
Ohishi (10) Patent No.: US 10,211,703 B2
(45) Date of Patent: Feb. 19, 2019

(54) POWER GENERATING UNIT

(71) Applicant: Panasonic Intellectual Property Managment Co., Ltd., Osaka (JP)

(72) Inventor: Suguru Ohishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 66 days.

(21) Appl. No.: 15/036,803

(22) PCT Filed: Nov. 21, 2014

(86) PCT No.: PCT/JP2014/005853
§ 371 (c)(1),
(2) Date: May 14, 2016

(87) PCT Pub. No.: WO2015/083339
PCT Pub. Date: Jun. 11, 2015

(65) Prior Publication Data
US 2016/0294256 A1     Oct. 6, 2016

Related U.S. Application Data

(60) Provisional application No. 61/912,552, filed on Dec. 6, 2013.

(51) Int. Cl.
*H02K 7/18* (2006.01)
*H02K 35/02* (2006.01)

(52) U.S. Cl.
CPC ......... *H02K 7/1892* (2013.01); *H02K 7/1876* (2013.01); *H02K 35/02* (2013.01)

(58) Field of Classification Search
CPC ............................ H02K 7/1892; H02K 7/1876
(Continued)

(56) References Cited

U.S. PATENT DOCUMENTS 6,774,588 B2 * 8/2004 Ibuki ................... H02P 25/032
310/20
7,021,603 B2 * 4/2006 Wygnaski ........... F16K 31/0682
251/129.15
(Continued)

FOREIGN PATENT DOCUMENTS

JP         2001-014980 A    1/2001
JP         2004-235059 A    8/2004
(Continued)

OTHER PUBLICATIONS

International Search Report of PCT application No. PCT/JP2014/005853 dated Feb. 10, 2015.

*Primary Examiner* — Terrance Kenerly
(74) *Attorney, Agent, or Firm* — McDermott Will & Emery LLP (57) ABSTRACT

A power generating unit of the preset invention includes: a power generating apparatus that has a push part, and generates power by pushing the push part; a rotating body that pushes the push part by rotating around a fulcrum; a drive body that rotates the rotating body by moving from a first position to a second position; and a first spring that returns the drive body from the second position to the first position. More preferably, the power generating unit further includes an actuating part; and a second spring disposed between the actuating part and the drive body, wherein the drive body is disposed between the first spring and the second spring. With this configuration, the power generating unit of the present invention can realize diversification of a use of the power generating apparatus.

14 Claims, 11 Drawing Sheets

Non-contact operation (58) Field of Classification Search
USPC .................................. 310/21, 12.14
See application file for complete search history.

(56) References Cited

U.S. PATENT DOCUMENTS

| | | |
|---|---|---|
| 2004/0182685 A1 | 9/2004 | Tsunemoto |
| 2007/0135756 A1* | 6/2007 | Kohlbrenner ......... A61M 5/178 604/21 |
| 2008/0174188 A1* | 7/2008 | Cederwall .............. H02K 35/02 310/36 |
| 2009/0007747 A1* | 1/2009 | Lee ...................... B21D 28/002 83/549 |
| 2009/0249775 A1* | 10/2009 | Murakami ................ F01B 5/00 60/370 |
| 2010/0193340 A1 | 8/2010 | Ujimoto et al. |
| 2011/0074227 A1* | 3/2011 | Amemiya ............ H02K 7/1876 310/12.14 |
| 2013/0010510 A1 | 1/2013 | Inada et al. |
| 2014/0285296 A1 | 9/2014 | Nagahara et al. |

FOREIGN PATENT DOCUMENTS

| | | |
|---|---|---|
| JP | 2005-176410 | 6/2005 |
| JP | 2006-012465 | 1/2006 |
| JP | 2006-158112 | 6/2006 |
| JP | 2010-179759 A | 8/2010 |
| JP | 2011-101448 | 5/2011 |
| JP | 2013-021746 | 1/2013 |
| JP | 2013-146172 | 7/2013 |
| JP | 2013-179809 A | 9/2013 |
| WO | 2013/084409 | 6/2013 |

* cited by examiner

FIG. 4A
Initial state

FIG. 4B
Contact operation

FIG. 4C

Complete contact state

FIG. 4D

Non-contact operation

Initial state

FIG. 7B

Contact operation

FIG. 7C

Complete contact state

FIG. 7D

Non-contact operation

FIG. 9

POWER GENERATING UNIT

TECHNICAL FIELD

The present invention relates to a power generating unit having a power generating apparatus.

BACKGROUND ART

In recent years, small-sized power generating apparatuses used in various electronic devices, devices for operation for remotely operating the various electronic devices, operation parts, and the like are known (refer to PTL 1, for example).

CITATION LIST

Patent Literature

PTL 1: International Publication No. 2013/084409

SUMMARY OF THE INVENTION

An object of the present invention is to propose a power generating unit that can be applied to a switch or a sensor, toward diversification of a power generating apparatus.

In order to achieve the above object, the present invention includes: a power generating apparatus that has a push part, and generates power by pushing the push part; a rotating body that pushes the push part by rotating around a fulcrum; a drive body that rotates the rotating body by moving from a first position to a second position; and a first spring that returns the drive body from the second position to the first position.

With this configuration, the power generating unit of the present invention can realize diversification of a use of the power generating apparatus.

DESCRIPTION OF EMBODIMENT

Prior to description of a power generating unit of this exemplary embodiment, a conventional power generating apparatus will be described.

Figure 1:
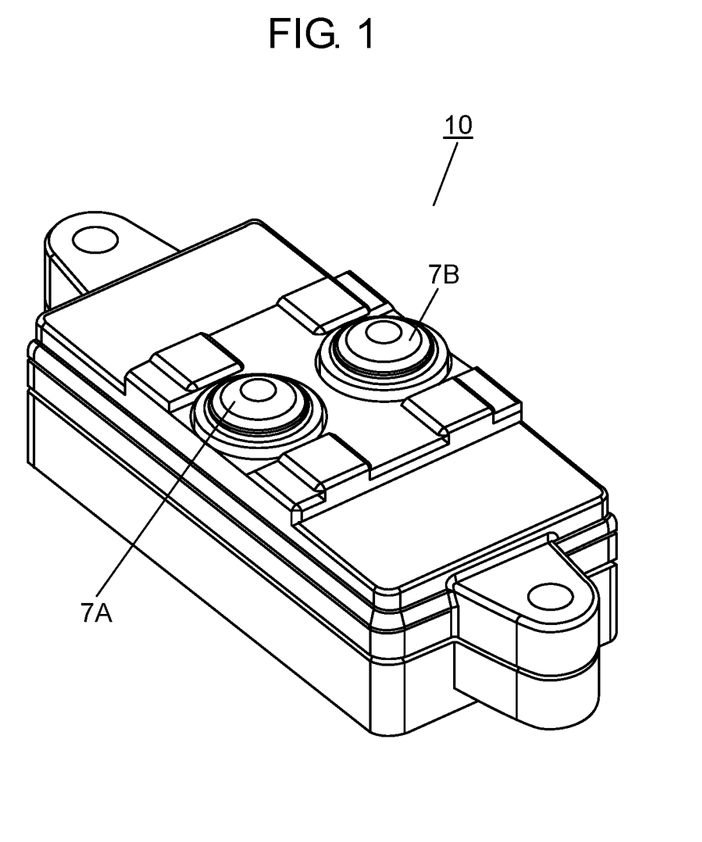
FIG. 1 is an external perspective view of a power generating apparatus.

FIG. 1 is an external perspective view of a power generating apparatus. As illustrated in FIG. 1, power generating apparatus 10 has buttons 7A, 7B. Power generating apparatus 10 is a push type power generating apparatus. The two buttons (button 7A, button 7B) are pushed, so that power generating apparatus 10 can transmit two different signals.

Another power generating apparatus (not illustrated) can transmit two different signals by a lever in place of the two buttons.

The power generating unit of this exemplary embodiment can be applied to a switch or a sensor by addition of a new mechanism to the power generating apparatus.

The power generating apparatus illustrated in FIG. 1 is an example, and the power generating apparatus configuring the power generating unit of the present invention is not limited to the power generating apparatus illustrated in FIG. 1.

First Exemplary Embodiment

<Configuration of Power Generating Unit 11>

Hereinafter, a configuration of a power generating unit of a first exemplary embodiment will be described with reference to FIG. 2 and FIG. 3.

Figure 2:
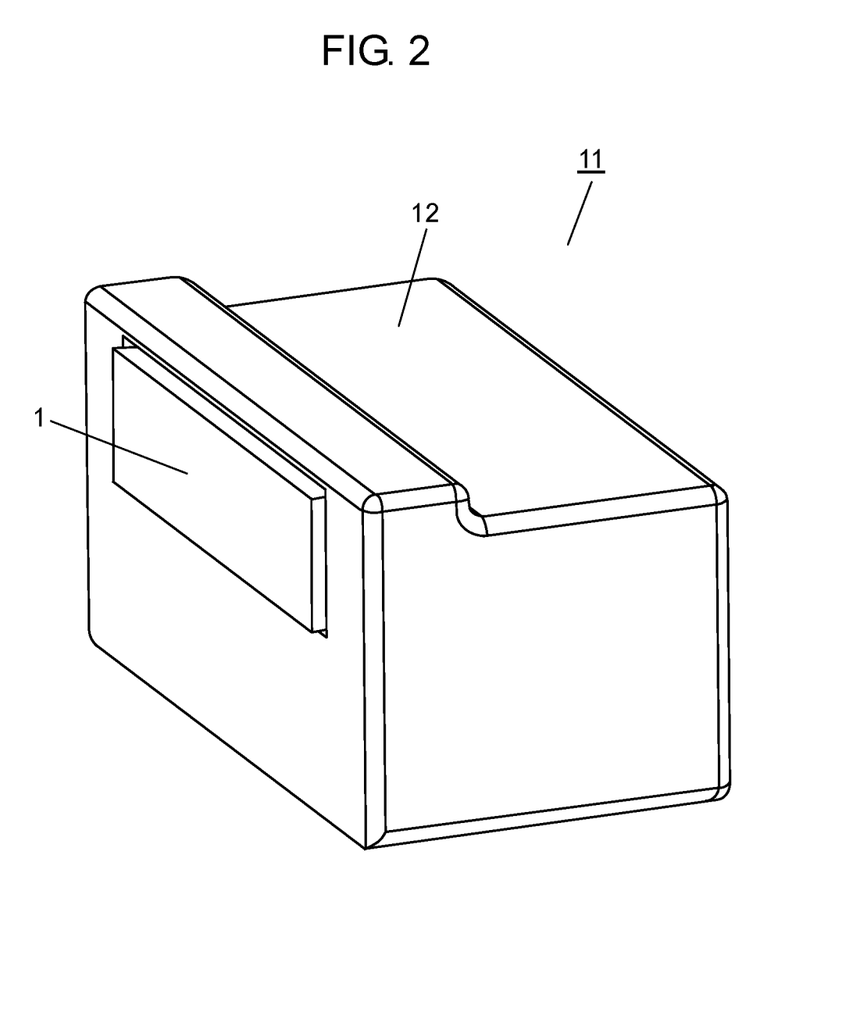
FIG. 2 is an external perspective view of a power generating unit according to a first exemplary embodiment.

FIG. 2 is an external perspective view of the power generating unit according to the first exemplary embodiment. In power generating unit 11, a power generating apparatus (not illustrated) is disposed in case (casing part) 12. Push plate 1 functions as an actuating part. Push plate (actuating part) 1 is pushed, so that the power generating apparatus disposed inside generates power.

Figure 3:
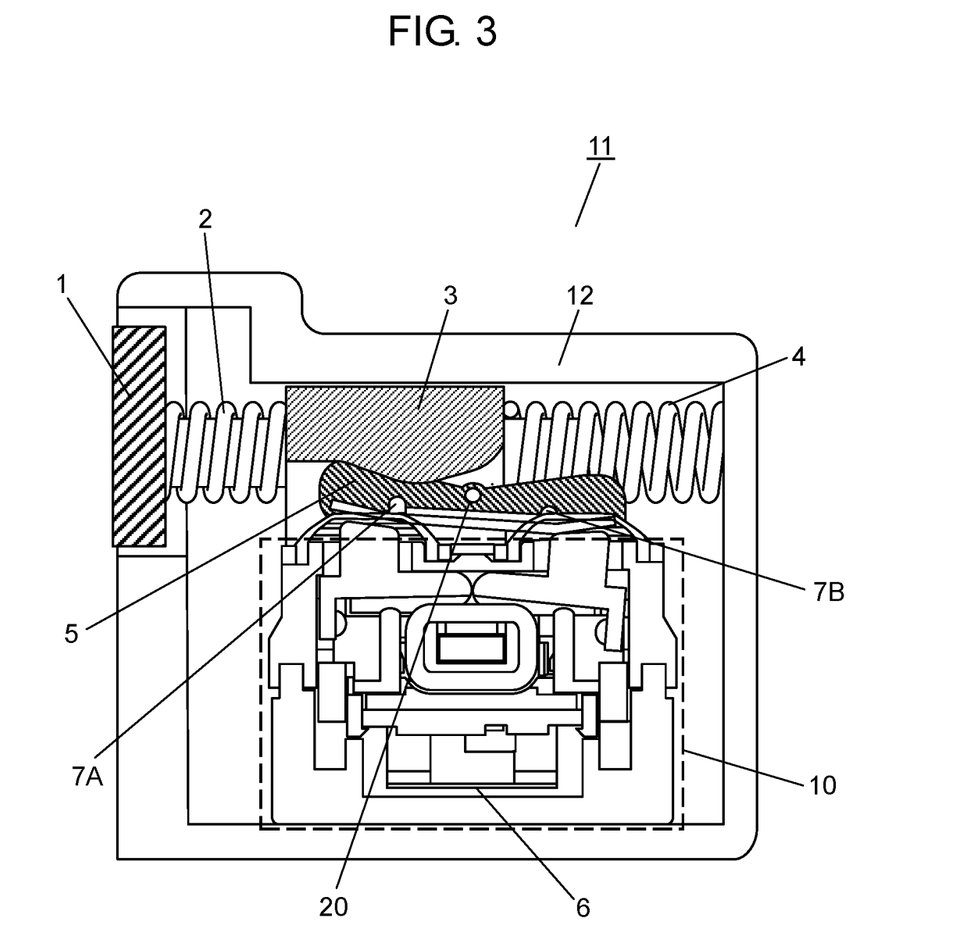
FIG. 3 is a schematic diagram illustrating a cross-section of the power generating unit according to the first exemplary embodiment.

FIG. 3 is a schematic diagram illustrating a cross-section of the power generating unit according to the first exemplary embodiment. Push plate 1 abuts on adjusting spring 2, and adjusting spring (second spring) 2 abuts on drive body 3. Drive body 3 abuts on return spring 4, and return spring (first spring) 4 abuts on an inner wall of case (casing) 12.

Further, with movement of drive body 3, rotating body 5 rotates around spindle (fulcrum) 20. In response to the rotation, rotating body 5 can alternately push button 7A and button 7B. Power generating apparatus 10 can generate power by pushing buttons 7A, 7B, and send signals from antenna 6 (transmission part) to outside. Detailed description of a configuration of power generating apparatus 10 is omitted.

That is, the power generating unit of this exemplary embodiment has buttons 7A, 7B (push parts), and has power generating apparatus 10 that generates power by pushing buttons 7A, 7B, rotating body 5 that pushes buttons 7A, 7B by rotating around spindle (fulcrum) 20, drive body 3 that rotates rotating body 5 by moving from a first position to a second position, and return spring (first spring) 4 that returns drive body 3 from the second position to the first position. The first position and the second position will be described hereinafter with reference to FIG. 4A to FIG. 4D.

<Mechanism of Power Generating Unit>

Now, a mechanism of the power generating unit of the first exemplary embodiment will be described with reference to FIG. 4A to FIG. 4 D.

Figure 4A:
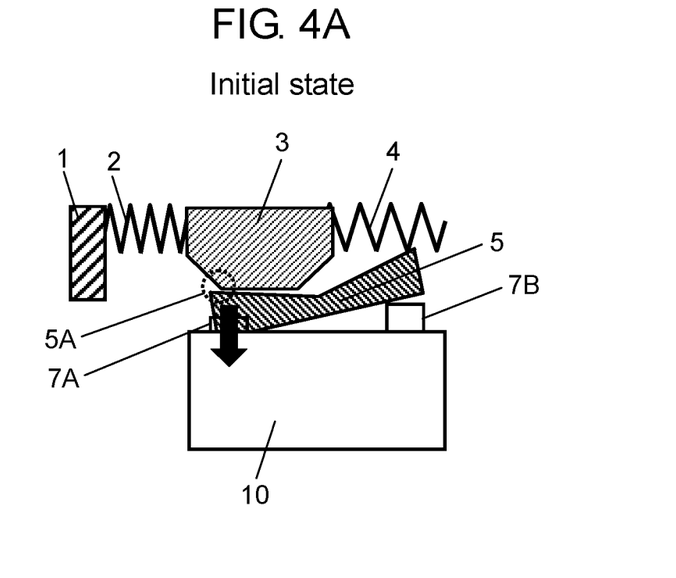
FIG. 4A is a pattern diagram illustrating an initial state of the power generating unit according to the first exemplary embodiment.
Figure 4B:
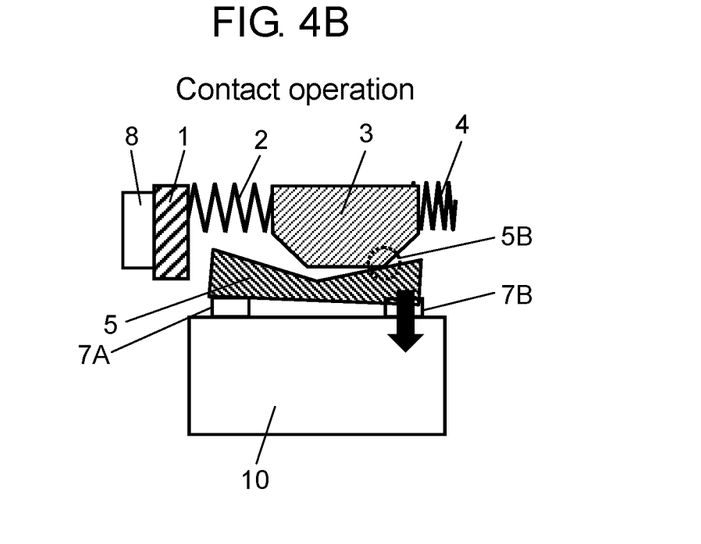
FIG. 4B is a pattern diagram for describing contact operation of the power generating unit according to the first exemplary embodiment.
Figure 4C:
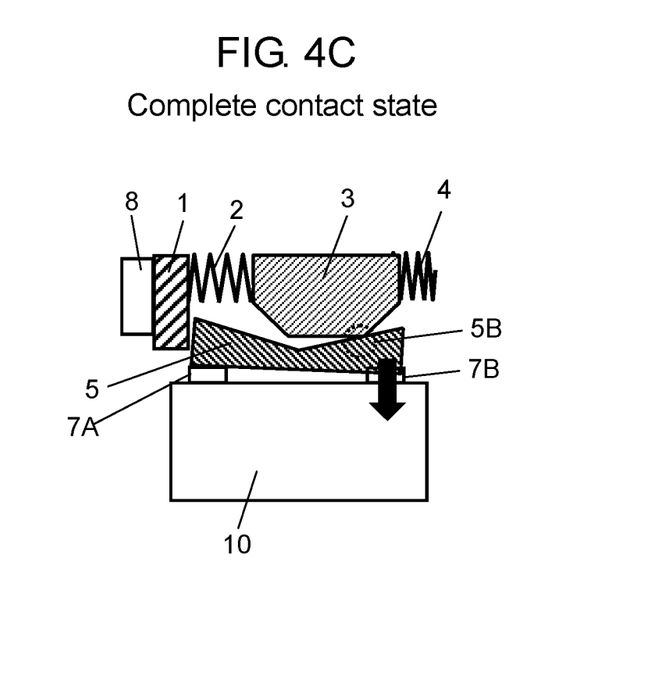
FIG. 4C is a pattern diagram illustrating a complete contact state of the power generating unit according to the first exemplary embodiment.

FIG. 4A is a pattern diagram illustrating an initial state of the power generating unit, FIG. 4B is a pattern diagram for describing contact operation of the power generating unit, FIG. 4C is a pattern diagram illustrating a complete contact state of the power generating unit, and FIG. 4C is a pattern diagram for describing non-contact operation of the power generating unit.

In FIG. 4A to FIG. 4D, configurations that are the same as configurations in FIG. 3 are denoted by the same reference numerals, and description of the configurations is omitted. A spring constant of return spring (first spring) 4 is lower than a spring constant of adjusting spring (second spring) 2.

That is, when the springs are pushed by the same force, return spring 4 is easily contracted compared to adjusting spring 2.

[Contact Operation of Power Generating Unit]

As illustrated in FIG. 4A, in an initial state, adjusting spring 2 and return spring 4 are each in an extended state. At this time, button 7A is pushed downward in the drawing. A position of drive body 3 at this time is defined as the first position.

Next, as illustrated in FIG. 4B, when pushing force is applied to push plate 1 from an external part, push plate 1 moves right in the drawing. Then, drive body 3 starts moving from the first position toward the second position (position of drive body 3 illustrated in FIG. 4C), and rotating body 5 rotates. At this time, drive body 3 separates from contact point 5A between drive body 3 and rotating body 5. On the other hand, drive body 3 comes into contact with rotating body 5 at contact point 5B. That is, button 7A returns to an original state (rising state), and button 7B is pushed downward. When button 7B is pushed, power generating apparatus 10 transmits a signal.

Further, when dive body 3 moves right by rightward pushing force from actuating body 8 to push plate 1, return spring 4 contracts earlier than adjusting spring 2. This is caused by a fact that the spring constant of return spring 4 is lower than the spring constant of adjusting spring 2. In FIG. 4B, only return spring 4 is compressed, and adjusting spring 2 is in a state that is the same as a state of FIG. 4A.

Figure 4D:
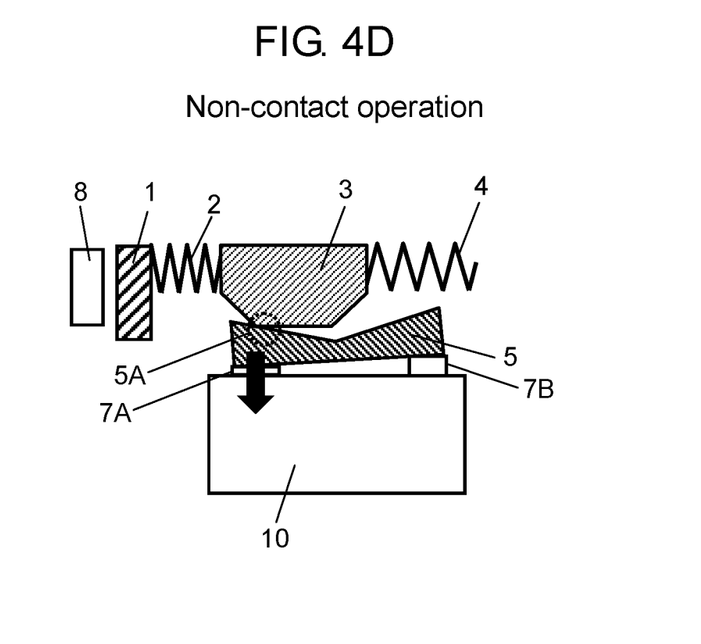
FIG. 4D is a pattern diagram for describing non-contact operation of the power generating unit according to the first exemplary embodiment.

As illustrated in FIG. 4D, when push plate 1 further moves right, adjusting spring 2 is also compressed, and the power generating unit is brought into a complete contact state.

[Non-Contact Operation of Power Generating Unit]

Now, when pushing force (illustrated by a black arrow in FIG. 5) which is applied from the external part (actuating body 8) to push plate 1 is lost, pushing force applied to return spring 4 and adjusting spring 2 is released at one time, as illustrated in FIG. 4D. Then, drive body 3 moves left. That is, drive body 3 returns from the second position toward the first position. At this time, button 7B returns to an original state (rising state), while button 7A is pushed downward. At this time, power generating apparatus 10 transmits a signal. The contact point between drive body 3 and rotating body 5 is changed from contact point 5B to contact point 5A. The power generating unit returns to the initial state illustrated in FIG. 4A.

Power generating unit 11 repeats a change from the initial state to the complete contact state, and a change from the complete contact state to the initial state. With the above operation, power generating unit 11 transmits signals from power generating apparatus 10.

In power generating unit 11 of this exemplary embodiment, power generating apparatus 10 disposed in power generating unit 11 is a button type power generating apparatus, and therefore a structure in which the two push parts (button 7A, button 7B) are alternately pushed is required. Rotating body 5 that utilizes a principle of a seesaw button is disposed.

In order to convert sliding motion into rotary motion, drive body 3 that pushes rotating body 5 is disposed, and return spring 4 is mounted in a tip of drive body 3.

With this configuration, the push parts (button 7A, button 7B) of power generating apparatus 10 can be alternately pushed by sliding operation of drive body 3.

In consideration of a stroke of drive body 3, a rotation amount of rotating body 5, and variation in positions of respective components, push plate 1 and adjusting spring 2 are preferably further mounted. Push plate 1 and adjusting spring 2 are mounted, so that a load applied to power generating apparatus 10 can be reduced. Even when positions of drive body 3 and rotating body 5 are deviated, adjusting spring 2 can absorb an error. Accordingly, it is possible to eliminate an excessive load or damage to power generating unit 11.

Meanwhile, a positional relation between drive body 3 and push plate 1 is preferably set such that button 7A and button 7B of power generating apparatus 10 can be pushed at an allowance worst value.

Force of return spring 4 is preferably set to be further lower than force of adjusting spring 2. Additionally, click pressure necessary for power generation is preferably set to be further lower than the force of return spring 4.

<Usage of Power Generating Unit of First Exemplary Embodiment>

Now, an example of usage of the power generating unit according to the first exemplary embodiment will be described with reference to FIG. 5 and FIG. 6.

An example in which power generating unit 11 of the first exemplary embodiment is used to detect opening of a double sliding window will be described.

Figure 5:
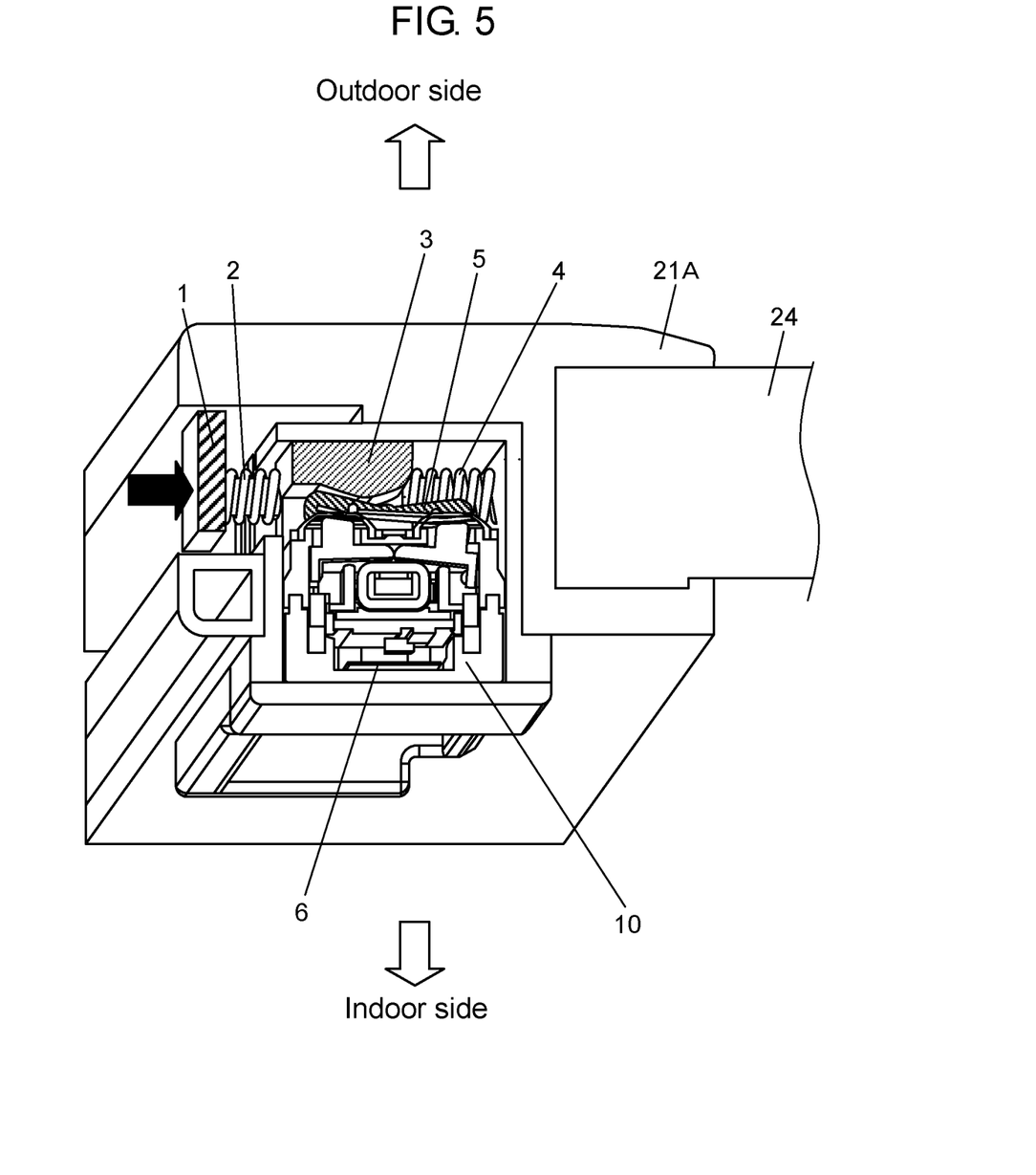
FIG. 5 is a schematic diagram illustrating the power generating unit according to the first exemplary embodiment which is mounted in a window sash.

FIG. 5 is a diagram illustrating power generating unit 11 of the first exemplary embodiment which is mounted in window sash 21A. As illustrated in FIG. 5, an upper side of FIG. 5 is an outdoor side, and a lower side of FIG. 5 is an indoor side. Window sash 21A is a frame that surrounds a periphery of glass 24, and other configurations are the same as the configurations of FIG. 3, and therefore are denoted by the same reference numerals, and description of the configurations is omitted.

Figure 6:
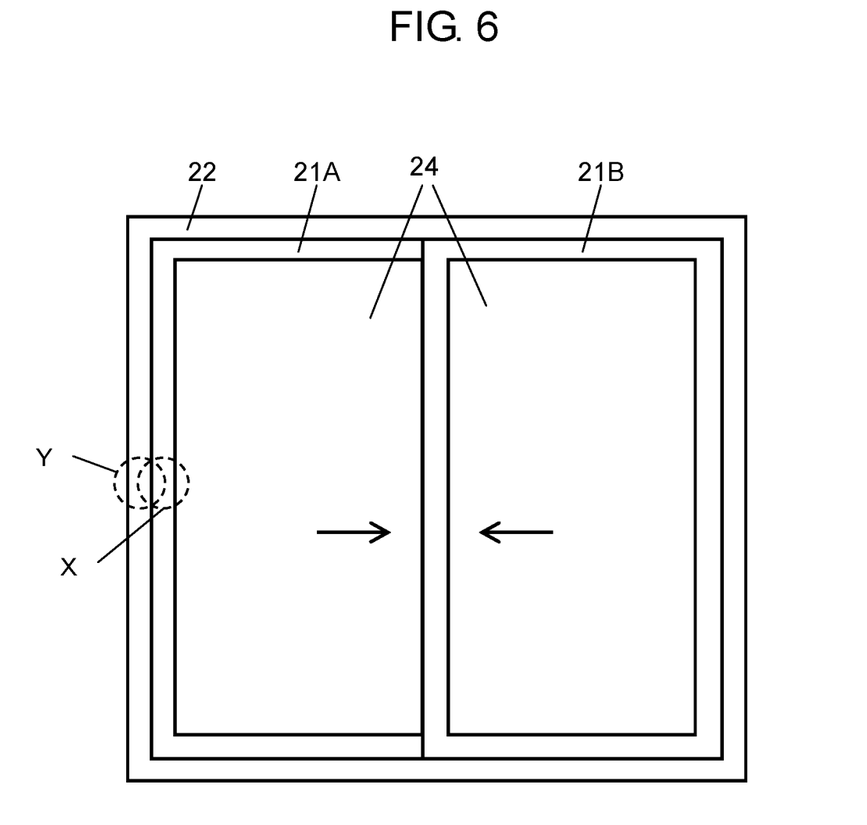
FIG. 6 is a diagram illustrating a window in which the power generating unit of the first exemplary embodiment is disposed.

In window sashes 21A, 21B illustrated in FIG. 6, power generating unit 11 is mounted in area X surrounded by a circle of dotted lines. Additionally, a protrusion (or a face) is formed in area Y, surrounded by a circle of dotted lines, of window frame 22. The protrusion (or a face) is configured to be able to push push plate 1 when window sash 21A is closed (is moved in a direction opposite to an arrow illustrated in FIG. 6). When window sash 21A is closed, the force illustrated by the black arrow in FIG. 5 is applied to push plate 1. The force is applied to push plate 1, so that a signal is transmitted from antenna 6 of power generating apparatus 10 disposed in power generating unit 11. By this signal, opening/closing of the window can be detected. Power generating unit 11 is mounted in window sash 21A, so that the opening/closing of the window can be easily detected.

Second Exemplary Embodiment

<Configuration of Power Generating Unit>

Now, a configuration of a power generating unit of a second exemplary embodiment will be described with reference to FIG. 8.

In power generating unit 11 of the first exemplary embodiment described with reference to FIG. 3, push plate 1 and drive body 3 move right by rightward force, so that rotating body 5 rotates. However, in the power generating unit of the second exemplary embodiment illustrated in FIG. 8, push plate 1 and drive body 3 move upward, so that rotating body 5 rotates.

Push plate 1, adjusting spring 2, drive body 3, and return spring 4 are disposed from a bottom in this order, and location of push plate 1, adjusting spring 2, drive body 3, and return spring 4 is different from location of push plate 1, adjusting spring 2, drive body 3, and return spring 4 of the power generating unit of the first exemplary embodiment. Additionally, by this difference in the location, a manner of contact between rotating body 5 and drive body 3 is different. Other configurations are similar to the configurations of the power generating unit of the first exemplary embodiment. Therefore, the configurations similar to the configurations of the first exemplary embodiment are denoted by the same reference numerals, and description of the configurations is omitted.

<Mechanism of Power Generating Unit>

Now, a mechanism of the power generating unit of the second exemplary embodiment will be described with reference to FIG. 7A to FIG. 7 D.

Figure 7A:
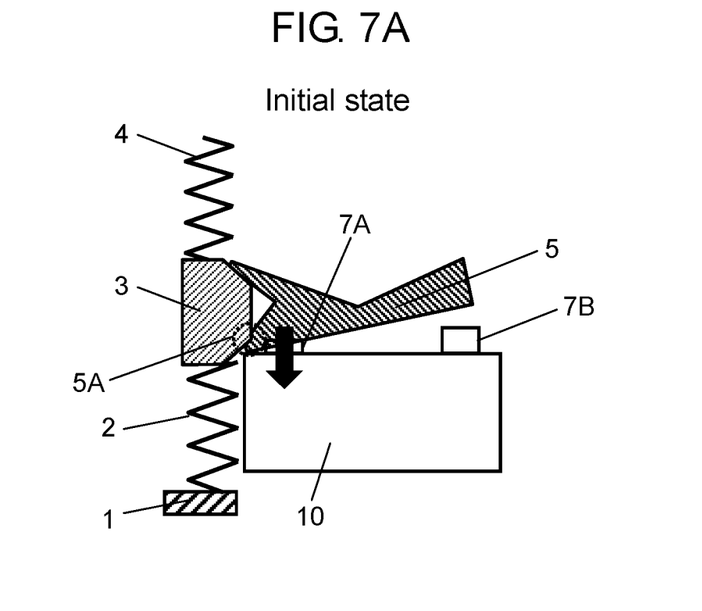
FIG. 7A is a pattern diagram illustrating an initial state of a power generating unit according to a second exemplary embodiment.
Figure 7B:
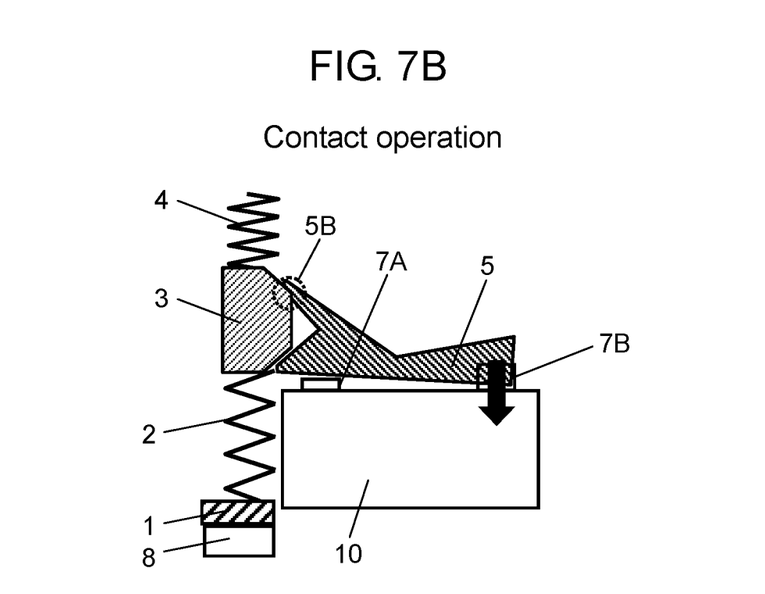
FIG. 7B is a pattern diagram for describing contact operation of the power generating unit according to the second exemplary embodiment.
Figure 7C:
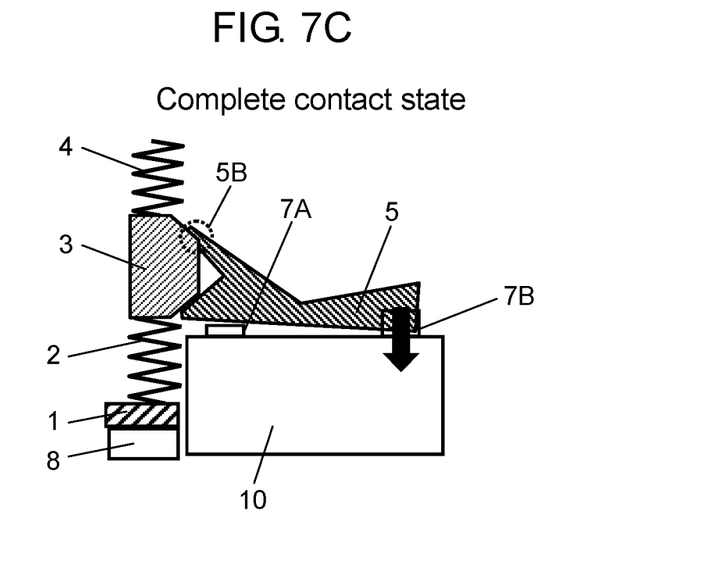
FIG. 7C is a pattern diagram illustrating a complete contact state of the power generating unit according to the second exemplary embodiment.
Figure 7D:
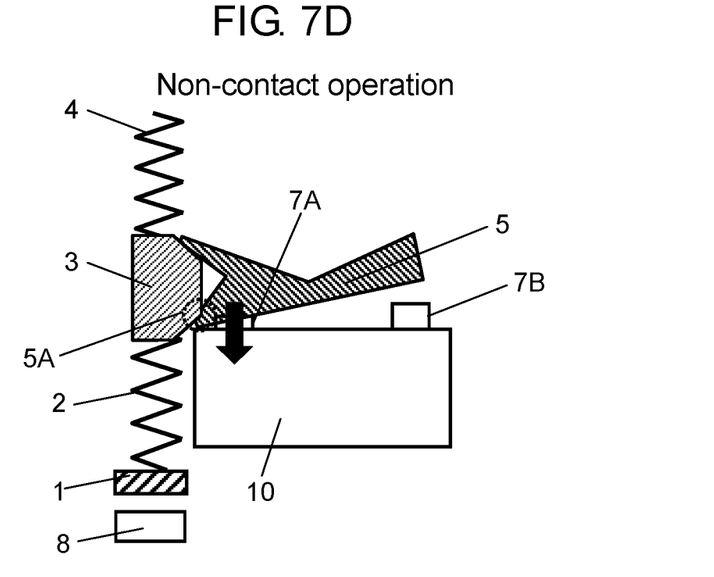
FIG. 7D is a pattern diagram for describing non-contact operation of the power generating unit according to the second exemplary embodiment.

FIG. 7A is a pattern diagram illustrating an initial state of the power generating unit, FIG. 7B is a pattern diagram for describing contact operation of the power generating unit, FIG. 7C is a pattern diagram illustrating a complete contact state of the power generating unit, and FIG. 7D is a pattern diagram for describing non-contact operation of the power generating unit.

Figure 8:
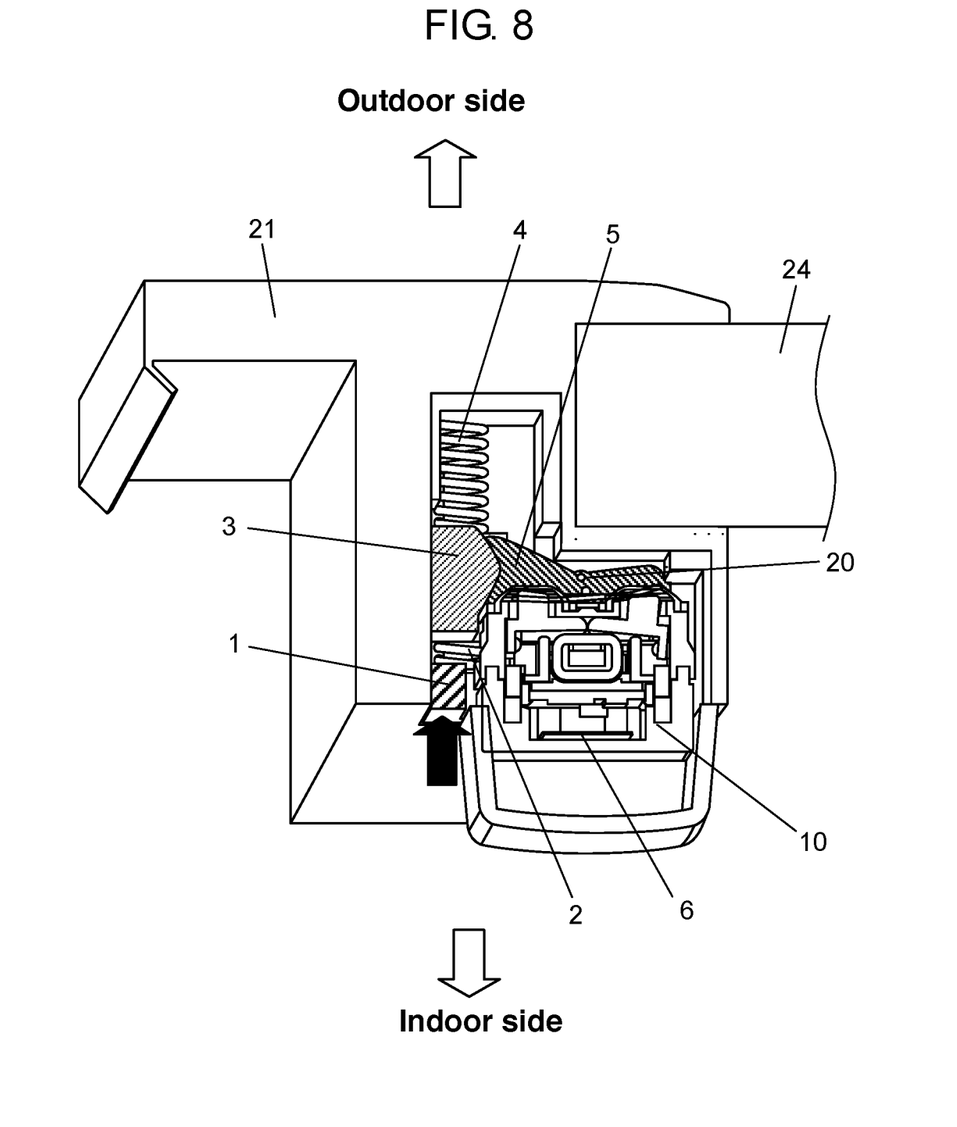
FIG. 8 is a schematic diagram illustrating the power generating unit according to the second exemplary embodiment which is mounted in a window sash.

In FIG. 7A to FIG. 7D, configurations that are the same as configurations in FIG. 8 are denoted by the same reference numerals, and description of the configurations is omitted. A spring constant of return spring (first spring) 4 is lower than a spring constant of adjusting spring (second spring) 2, similarly to the first exemplary embodiment.

[Contact Operation of Power Generating Unit]

As illustrated in FIG. 7A, in an initial state, adjusting spring 2 and return spring 4 are each in an extended state. At this time, button 7A is pushed downward in the drawing. A position of drive body 3 at this time is defined as a first position.

Further, as illustrated in FIG. 7B, when pushing force is applied to push plate 1 from an external part, push plate 1 moves upward in the drawing. Then, drive body 3 starts moving from the first position toward a second position (position of drive body 3 illustrated in FIG. 7C), and rotating body 5 rotates. At this time, drive body 3 separates from contact point 5A between drive body 3 and rotating body 5, and drive body 3 conversely comes into contact with rotating body 5 at contact point 5B. That is, button 7A returns to an original state (rising state), and button 7B is pushed downward. When button 7B is pushed, power generating apparatus 10 transmits a signal.

When dive body 3 moves upward by upward pushing force from actuating body 8 to push plate 1, return spring 4 contracts earlier than adjusting spring 2. This is caused by a fact that the spring constant of return spring 4 is lower than the spring constant of adjusting spring 2. In FIG. 7B, only return spring 4 is compressed, and adjusting spring 2 is in a state that is the same as a state of FIG. 7A.

Furthermore, as illustrated in FIG. 7C, when push plate 1 further moves upward, adjusting spring 2 is also compressed, and the power generating unit is brought into a complete contact state.

[Non-Contact Operation of Power Generating Unit]

Now, when pushing force (illustrated by a black arrow in FIG. 5) which is applied from the external part (actuating body 8) to push plate 1 is lost, pushing force applied to return spring 4 and adjusting spring 2 is released at one time, as illustrated in FIG. 7D. Then, drive body 3 moves downward. That is, drive body 3 returns from the second position toward the first position. At this time, button 7B returns to an original state (rising state), while button 7A is pushed downward. At this time, power generating apparatus 10 transmits a signal. The contact point between drive body 3 and rotating body 5 is changed from contact point 5B to contact point 5A. The power generating unit returns to the initial state illustrated in FIG. 7A.

Power generating unit 11 repeats a change from the initial state to the complete contact state, and a change from the complete contact state to the initial state. With the above operation, power generating unit 11 transmits signals from power generating apparatus 10.

In the first exemplary embodiment, push plate 1, adjusting spring 2, drive body 3, and return spring 4 are disposed in a horizontal direction. On the other hand, in the second exemplary embodiment, push plate 1, adjusting spring 2, drive body 3, and return spring 4 are disposed in a vertical direction. Other configurations of the second exemplary embodiment are similar to the configurations of the first exemplary embodiment, and effects are also similar to the effects of the first exemplary embodiment.

<Usage of Power Generating Unit>

Now, an example of usage of the power generating unit according to the second exemplary embodiment will be described with reference to FIG. 8 and FIG. 9.

An example in which power generating unit 11 of the second exemplary embodiment is used to detect opening of a projected window (vertically projected window) will be described.

FIG. 8 is a diagram illustrating power generating unit 11 of the second exemplary embodiment which is mounted in window sash 21. As illustrated in FIG. 8, an upper side of FIG. 8 is an outdoor side, and a lower side of FIG. 5 is an indoor side. Window sash 21 is a frame that surrounds a periphery of glass 24, and other configurations similar to the configurations of the first exemplary embodiment are denoted by the same reference numerals, and description of the configurations is omitted.

Figure 9:
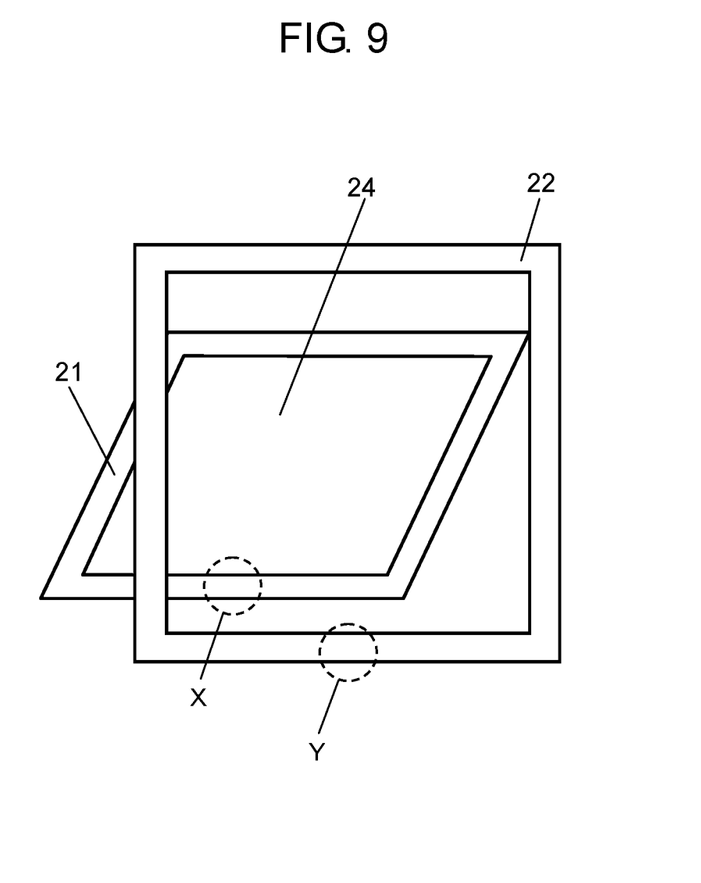
FIG. 9 is a diagram illustrating a window in which the power generating unit of the second exemplary embodiment is disposed.

Power generating unit 11 is mounted in area X surrounded by a circle of dotted lines in window sash 21 illustrated in FIG. 9. Additionally, a protrusion (or a face) is formed in area Y, surrounded by a circle of dotted lines, of window frame 22, when window sash 21 is closed. The protrusion (or a face) is configured to be able to push push plate 1 when window sash 21 is closed. When window sash 21 is closed, the force illustrated by the black arrow in FIG. 8 is applied to push plate 1. When the force is applied to push plate 1, a signal is transmitted from antenna 6 of power generating apparatus 10 disposed in power generating unit 11. By this signal, opening/closing of the window can be detected. Power generating unit 11 is mounted in window sash 21, so that the opening/closing of the window can be easily detected.

In the first exemplary embodiment and the second exemplary embodiment, a back surface of power generating apparatus 10 is disposed on the indoor side, and therefore antenna (transmission part) 6 is disposed indoors. Accordingly, it is possible to optimize a radio wave characteristic of antenna (transmission part) 6.

Power generating apparatus 10 is a push type apparatus, and therefore drive body 3 and return spring 4 are provided, so that it is possible to reduce an excessive load to case (casing part) 12 of power generating apparatus 10.

Power generating apparatus 10 is mounted inside window sash 21A (or 21), and therefore any protrusion is not formed in window sash 21A (or 21). Accordingly, safety of window sash 21A (or 21) is ensured.

In this exemplary embodiment, power generating unit 11 is mounted in window sash 21A (or 21). However, power generating unit 11 may be mounted in window frame 22, and the protrusion may be provided in window sash 21A (or 21). Additionally, in this exemplary embodiment, the protrusion is provided in window frame 22, but the protrusion may not always be provided in window frame 22, and may be provided in a wall or the like. As long as the protrusion can push push plate 1 of power generating unit 11, a place where the protrusion is disposed is not limited.

In this exemplary embodiment, glass 24 is formed on an inside of window sash 21A (or 21), but may not be always formed.

Power generating apparatus 10 of this exemplary embodiment has two buttons 7A, 7B. However, the push part may not be always configured by two buttons 7A, 7B.

In this exemplary embodiment, power generating unit 11 is mounted in window sash 21A (or 21) or window frame 22, but may be mounted in an openable part such as a drawer and a strongbox. A place where power generating unit 11 is disposed is not limited to window sash 21A (or 21) or window frame 22.

When power generating apparatus 10 has a transmission part, opening/closing of a window, a drawer, a strongbox, or the like can be informed by communication means such as radio waves.

In the description of this exemplary embodiment, antenna 6 is used as the transmission part. However, the transmission part is not limited to an antenna. As other example, the transmission part may be formed by an LED (Light Emission Diode).

INDUSTRIAL APPLICABILITY

The power generating unit of the present invention can realize diversification of a use of the power generating apparatus. Additionally, the power generating unit of this exemplary embodiment can be applied to a switch or a sensor.

REFERENCE MARKS IN THE DRAWINGS 1 push plate (actuating part)
2 adjusting spring (second spring)
3 drive body
4 return spring (first spring)
5 rotating body
5A, 5B contact point
6 antenna (transmission part)
7A, 7B button (push part)
8 actuating body
10 power generating apparatus
11 power generating unit
12 case (casing part)
20 spindle (fulcrum)
21, 21A, 21B window sash
22 window frame
24 glass

The invention claimed is:

1. A power generating unit comprising:
a rotating body configured to rotate around a fulcrum;
a first push part configured to move responding to a motion of the rotating body;
a second push part configured to move responding to the motion of the rotating body;
a power generating apparatus configured to generate electric power by a motion of the first push part and a motion of the second push part;
a drive body configured to rotate the rotating body by moving from a first position to a second position; and
a first spring configured to return the drive body from the second position to the first position,
wherein the first push part and the second push part are moved in different directions with the motion of the rotating body.

2. The power generating unit according to claim 1, further comprising:
an actuating part; and
a second spring disposed between the actuating part and the drive body,
wherein the drive body is disposed between the first spring and the second spring, and
the first spring and the second spring contract by a push from the actuating part.

3. The power generating unit according to claim 2, wherein a spring constant of the first spring is lower than a spring constant of the second spring.

4. The power generating unit according to claim 2, wherein the actuating part is formed by a push plate.

5. The power generating unit according to claim 1, wherein the power generating apparatus further includes a transmission part configured to transmit a signal using the electric power generated by the power generating apparatus.

6. The power generating unit according to claim 1, wherein the rotating body is a separated member from the first push part and the second push part.

7. The power generating unit according to claim 1, wherein the rotating body is connected to the first push part and the second push part.

8. The power generating unit according to claim 7, wherein the rotating body is formed integrally with the first push part and the second push part.

9. A power generating unit comprising:
a drive body configured to move to a first direction which is a direction from a first position to a second position and move to a second direction which is a direction from the second position to the first position; and
a power generating apparatus including a first push part and a second push part, wherein:

the first push part is configured to be pushed to a third direction which crosses the second direction by the drive body when the drive body moves to the first direction, the second push part is configured to be pushed to the third direction by the drive body when the drive body moves to the second direction, and the power generating apparatus generates electric power by the first push part or the second push part being pushed.

10. The power generating unit according to claim 9, wherein:

the first push part moves to a forth direction which is opposite to the third direction when the second push part is pushed, and the second push part moves to the forth direction when the first push part is pushed.

11. A power generating unit comprising:

a drive body configured to reciprocally move along a first axis; and a power generating apparatus including a first push part and a second push part and configured to generate electric power by movement of the first push part and the second push part, wherein:

the power generating unit is configured such that a reciprocating movement of the drive body along the first axis is converted to a movement of the first push part to be pushed down along a second axis crossing the first axis and to a movement of the second push part to be pushed down along the second axis, and the first push part and the second push part are configured to be alternately pushed down along the second axis.

12. The power generating unit according to claim 11, wherein the power generating unit is configured such that, when the drive body moves in one direction of the first axis, the first push part is pushed down and when the drive body moves in another direction of the first axis opposite to the one direction, the second push part is pushed down.

13. The power generating unit according to claim 12, wherein the power generating unit is configured such that, when the drive body moves in one direction of the first axis and the first push part is pushed down, the second push part moves up, and when the drive body moves in the another direction and the second push part is pushed down, the first push part moves up.

14. The power generating unit according to claim 11, wherein the reciprocating movement of the drive body is converted by a seesaw movement to the movement of the first push part and the movement of the second push part.

* * * * *